United States Patent [19]

Leimgruber

[11] Patent Number: 4,659,096
[45] Date of Patent: Apr. 21, 1987

[54] CARRIAGE DEVICE

[76] Inventor: John Leimgruber, 4822 Seventh Ave., Temple, Pa. 19560

[21] Appl. No.: 708,808

[22] Filed: Mar. 6, 1985

[51] Int. Cl.$^4$ .............................................. B62B 3/02
[52] U.S. Cl. .................................. 280/39; 280/47.37 R
[58] Field of Search .................. 280/39, 40, 642, 643, 280/644, 646, 42, 647, 648, 650, 651, 655, 658, 43.13, 43.21, 47.37 R, 47.38, 47.41, 79.2

[56] References Cited

U.S. PATENT DOCUMENTS

| 861,475 | 7/1907 | McGill | 280/39 |
|---|---|---|---|
| 863,972 | 8/1907 | Ehlers | 280/39 |
| 924,008 | 6/1909 | Smith | 280/39 |
| 2,582,435 | 1/1952 | Howard | 280/648 |
| 2,587,688 | 3/1952 | Bosk | 280/39 |
| 2,786,692 | 3/1957 | Timpson | 280/648 |
| 3,400,942 | 9/1968 | Hull | 280/39 |
| 4,274,644 | 6/1981 | Taylor | 280/39 |

FOREIGN PATENT DOCUMENTS 2117 of 1911 United Kingdom .................. 280/39

Primary Examiner—John J. Love
Assistant Examiner—Michael Mar
Attorney, Agent, or Firm—Jacob Trachtman

[57] ABSTRACT

A carriage device providing a base structure having a frame with a pair of parallel tubular members and front and rear cross members extending between and secured therewith to provide a rectangular configuration, and wheel means for movably supporting the base structure having a folded position proximate to the base structure and an extended operative position. Handle means provide for the base structure is movable between a folded position proximate to the base structure and an extended position away from the base structure, and wheel positioning means comprise a pair of elongated rod elements each received and enclosed within a respective one of the tubular members are rotatable for moving the wheel means between their extended and folded positions by the corresponding movement of the handle means. Locking means engage the rod elements of the wheel positioning means for automatically locking the wheel positioning means against movement when the wheel means is either in its extended or folded positions. An infant seat is extendable from the handle means for use and is foldable when not in use. A foldable frame unit is secured with the front cross member to provide the container of a collapsible shopping cart.

17 Claims, 16 Drawing Figures

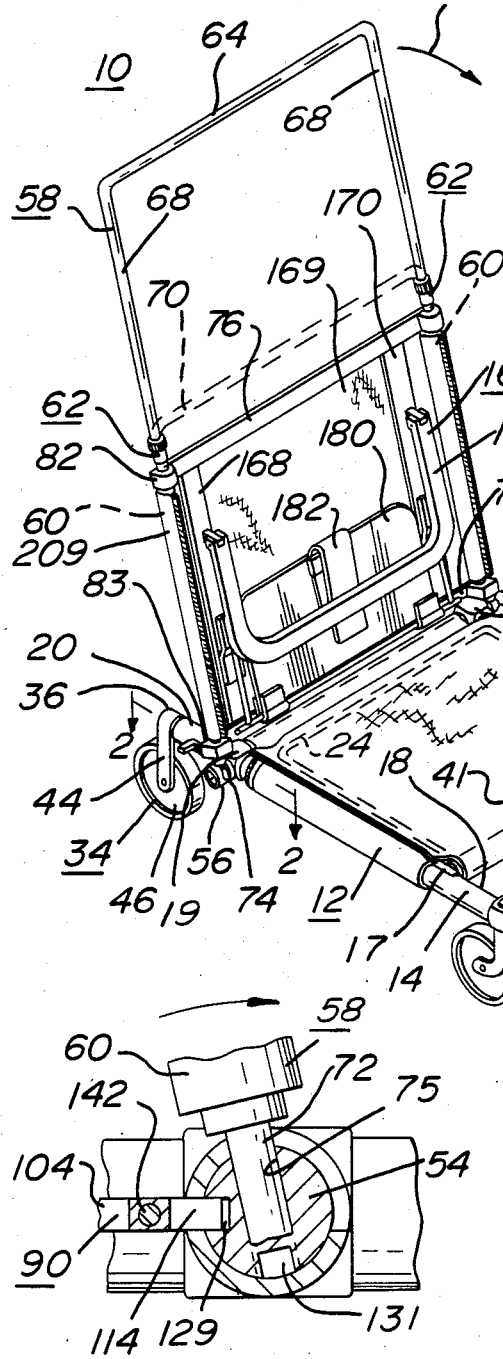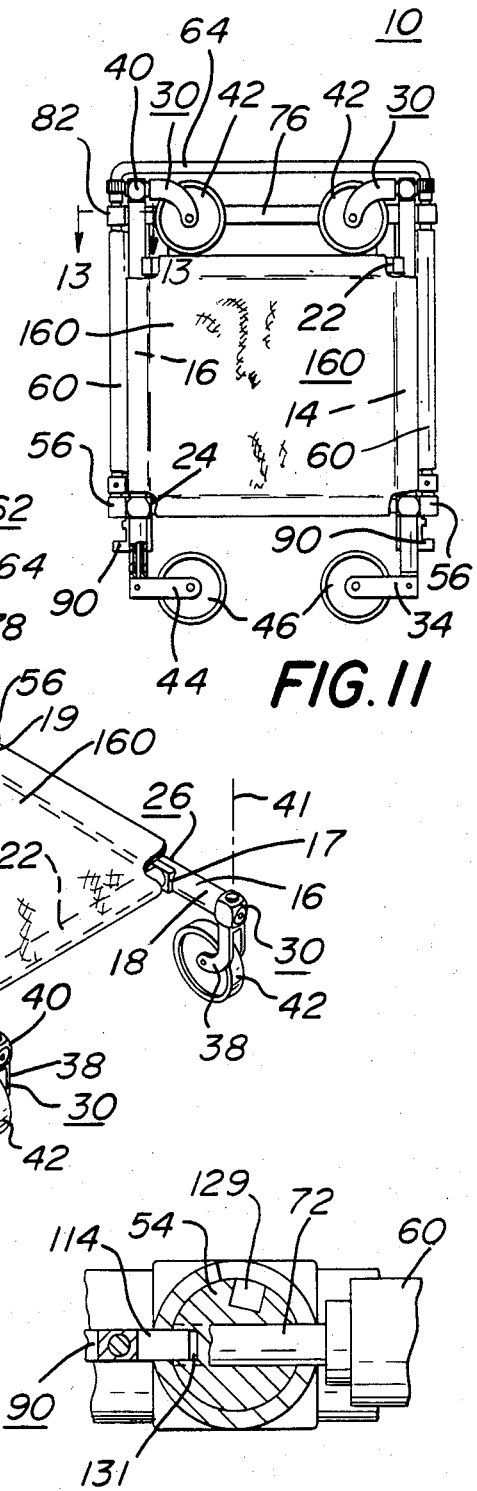

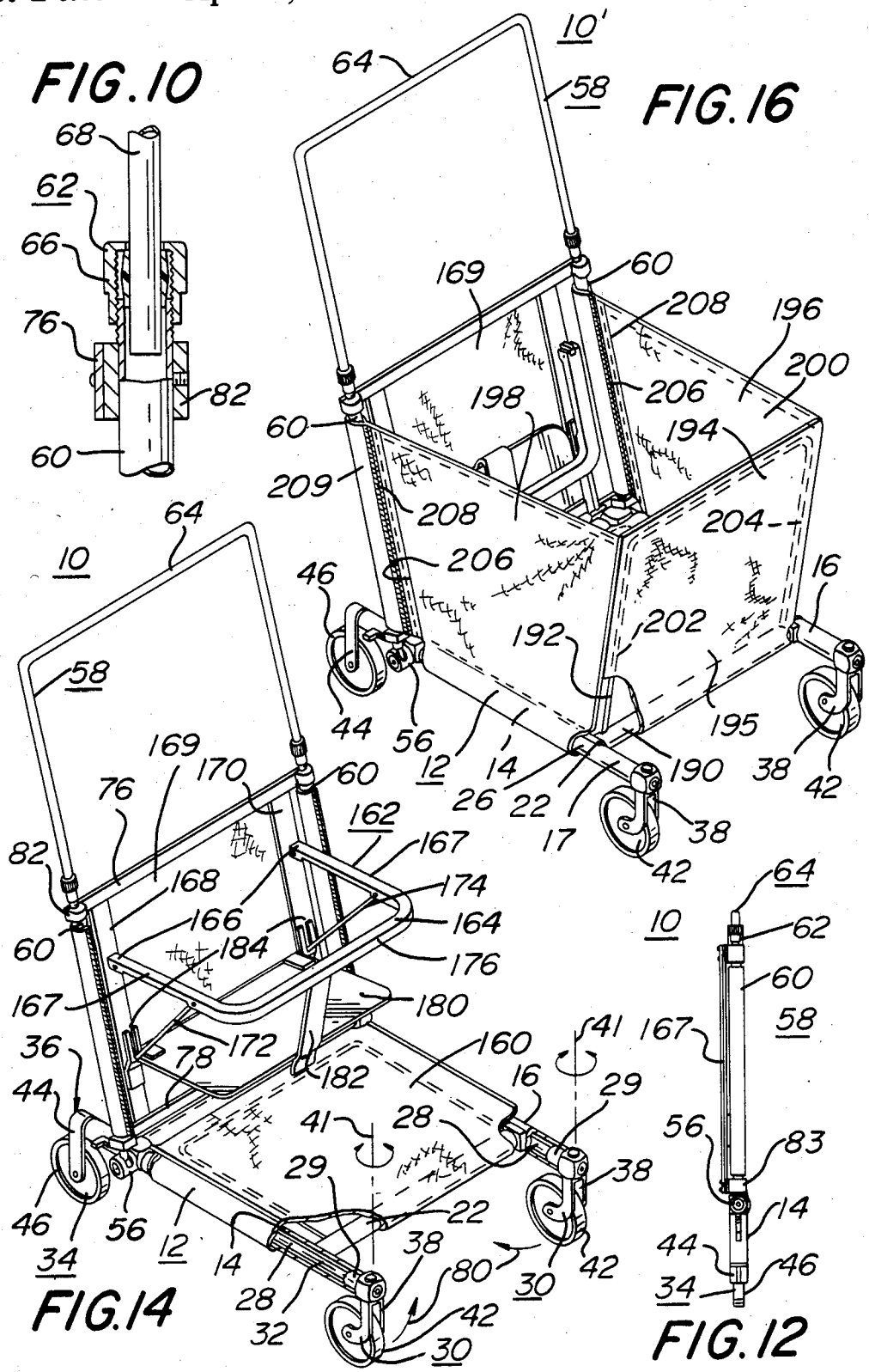

CARRIAGE DEVICE

BACKGROUND OF THE INVENTION

The invention relates to a carriage device, and more particularly to a carriage device which has handle and wheel means foldable into a compact structure and which is extendable to provide a luggage carrier, shopping cart and baby seat.

Heretofore foldable carriage devices have been provided which are complex in structure, difficult to place in their folded and unfolded conditions, and leave exposed many of the movable operating components which in addition to being unsightly provide a safety hazard. In this regard, it is noted that the four wheeled hand truck disclosed in Pat. No. 4,274,644 provides a foldable structure which has exposed rotatable elements, gear means and a locking structure. It would, therefore, be desirable to provide a versatile foldable carriage device which is strong and durable, can easily be extended and folded, and locked in position, and which also encloses its rotatable elements, gears and locking means.

SUMMARY OF THE INVENTION

It is therefore an object of the invention to provide a new and improved carriage device which may be utilized as a luggage carrier, shopping cart and infant carrier.

Another object of the invention is to provide a new and improved carriage device which is strongly constructed for carrying heavy loads, and can be compactly folded to reduced size.

Another object of the invention is to provide a new and improved carriage device which can be placed in its extended usable form and returned to its compact folded form by movement of its handle means between its extended and folded positions.

Another object of the invention is to provide a new and improved carriage means which may easily be opened to its extended position and closed to its folded position, and is automatically locked in position upon being placed in either position.

Another object of the invention is to provide a new and improved carriage device which is extendable to its opened operative condition and closed to a compact form with its wheels and handle means folded to lie within the plane of its base structure.

Another object of the invention is to provide a new and improved carriage device having wheel positioning means which is enclosed by the base structure of the carriage device.

Another object of the invention is to provide a new and improved carriage device having a locking means which releasably retains the handle and wheel means in their extended or folded positions and is easily released for allowing the carriage means to be changed from either of its folded or extended positions to its other position.

Another object of the invention is to provide a new and improved carriage device in which the locking means for retaining the carriage device in its extended or folded conditions is readily released, and automatically engages and locks the carriage device when its condition is changed from one to the other of its extended and folded positions.

Another object of the invention is to provide a new and improved carriage device having side wall portions which may be extended when the carriage device is in its extended position for forming a shopping cart, and a handle means having a portion which may be extended for providing an infant seat.

Another object of the invention is to provide a new and improved carriage device which is efficient in operation, rugged in construction, and substantially free of maintenance.

The above and other objects of the invention are achieved by providing a carriage device comprising a flat base structure, and a plurality of wheels for movably supporting the base structure. The wheels have a folded position proximate to and in the plane of the base structure, and an extended operative position displaced from the plane of the base structure. A handle for the base structure is movable between a folded position proximate to and in plane of the base structure and an extended position away from the base structure. Wheel positioning means which are received within and substantially enclosed by the base structure are actuated by the handle means for moving the wheels between their extended and folded position as the handle means is moved correspondingly between its extended and folded positions.

The frame structure comprises a pair of parallel tubular members with front and rear ends. A front cross member and a rear cross member each extends between and is secured respectively proximate to the front ends and rear ends of the pair of tubular members to provide a rectangular configuration. Each of the tubular members receives therewithin one of a pair of elongated rod elements of the wheel positioning means. One of the wheels is secured at each of the front ends and rear ends of the rod elements and proximate to the front and rear ends of the corresponding tubular members. The rod elements are rotatable within the tubular members for moving the wheels between their extended and folded position and each has gear means which are engaged by the handle means for rotating their rod elements with the movement of the handle means. Each gear means includes first and second interengaged gears which are each rotatable about respectively perpendicular axes. A first gear is secured with each of the rod elements intermediate its front and rear ends, while a second gear engaging each first gear is secured with the handle means for being rotated with movement of the handle means and rotating its respective rod element.

The base structure includes web means secured with the members of the frame to provide a bottom support surface for the carriage device. An infant seat is secured with the handle means to extend over the frame when in use and is foldable into the plane of the handle means when not in use. A front frame unit is pivotally secured with the front cross member of the base structure and is movable between a folded position between and in the plane of the tubular members of the frame, and an extended position in which it is upstanding at the front end of the frame. A flexible web is supported by the front frame unit to provide a front wall, and also extends between the frame unit, the bottom portions of the handle means and the tubular means of the frame, to provide a pair of side walls of a container which is formed when the handle means and frame unit are in their extended positions to provide a shopping cart.

The carriage device includes locking means which automatically engage the wheel positioning means and handle means for releasably securing the wheel means and handle means against movement from their folded positions when placed in their folded positions, and which automatically engage the wheel positioning means and handle means for securing the wheel means and handle means against movement from their extended positions when the handle means is placed in its extended position. The locking means includes a latch portion for releasably engaging and locking each of the rod elements against rotation when the handle means is moved to either its folded or extended position. Upon being disengaged by its latch portion, the rod elements are rotatable with movement of the handle means from its folded or extended position to its other position at which time it is automatically locked in this position.

Each rod element has secured therewith an annular unit providing an upstanding portion with a side wall having angularly spaced first and second openings for being engaged by the latch portion of the locking means. The latch portion engages the first opening when the handle means is in its folded position and engages the second openings when the handle means is in its extended position. Spring means urge the latch portion of the locking means towards and into contact with the side wall of the upstanding portion for automatically moving the latch portion into one of its openings upon its alignment therewith. Detent means maintains the latch portion out of contact with the side wall of the upstanding portion upon disengagement of the latch portion with its movement out of one of the openings of the upstanding portion, and allows the latch portion to contact the side wall of the upstanding portion when the rod element upon rotation moves the opening out of alignment with the latch portion.

BRIEF DESCRIPTION OF THE DRAWING

The foregoing and other objects of the invention will become more apparent as the following detailed description is read in conjunction with the drawing, in which:

FIG. 1 is a perspective view of a carriage device embodying the invention with its handle means and wheel means locked in their extended positions, FIG. 8 is a sectional view taken on line 8—8 of FIG. 2, FIG. 9 is a sectional view similar to that of FIG. 8, with the carriage device locked in its folded position, FIG. 10 is an enlarged sectional view of a portion of the handle means illustrating the adjustment means for securing a telescoping portion of the handle means in an adjusted extended position or in its collapsed position, FIG. 11 is a bottom plan view of the carriage device in its folded condition, FIG. 12 is a left side elevational view of FIG. 11, FIG. 14 is a perspective view similar to that of FIG. 1 with portions broken away and showing the infant seat in its extending position and in condition for use, FIG. 16 is a perspective view of a modified form of the device shown in FIG. 1 including collapsible front and side walls for forming the container of a shopping cart, Like reference numerals designate like parts throughout the several views.

DETAILED DESCRIPTION

Figure 2:
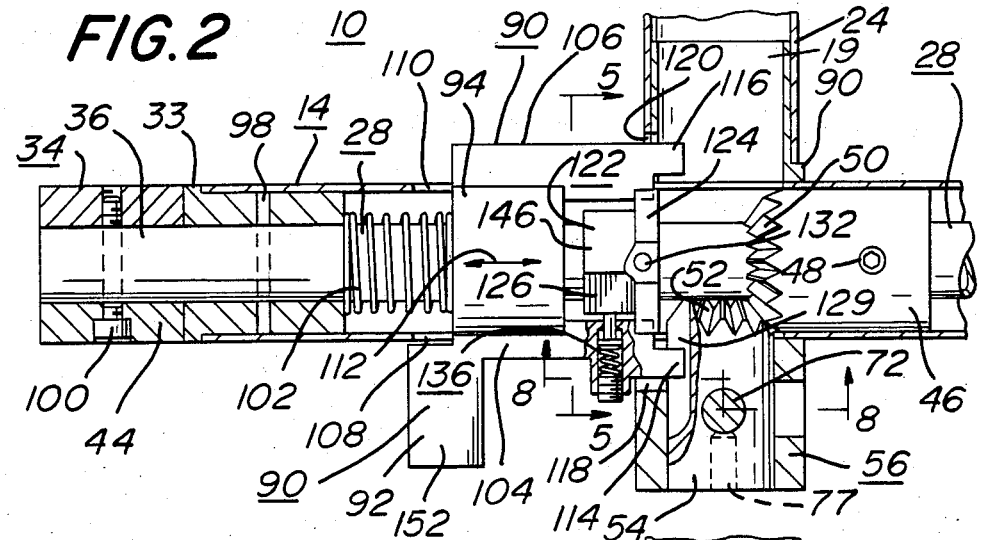
FIG. 2 is a sectional view taken on the line 2—2 of FIG. 1.

Refer to FIGS. 1 to 15 which illustrate a carriage device 10 embodying the invention. The carriage device 10 includes a base structure 12 comprising a pair of parallel tubular members 14, 16 of high strength, preferably of metal, each having front ends 18 and rear ends 20 which are respectively joined by a pair of parallel front and rear tubular cross members 22 and 24 also of high strength. The front cross member 22 has its ends secured proximate to the front ends 18 of the tubular members 14 and 16 by fixtures 17, while the rear cross member 24 has its ends connected proximate to the rear ends 20 of the tubular members 14 and 16 by fixtures 16 to provide a substantially rectangular frame 26 of great strength. As shown in FIG. 14, each of the tubular members 14 and 16 receives within it an elongated rod element 28 which preferably are of metal. Each rod element 28 has a spacer 29 and a front wheel means 30 secured to it at its front end 32 and a spacer 33 (FIG. 2) and a rear wheel means 34 secured to it at its rear end 36. Each of the front wheel means 30 has a wheel retaining fork 38 secured to a base 40 (FIG. 1) which allos swivelling about an axis 41. The base support 40 is clamped to the end of the rod element 28 for rotation therewith, and a wheel 42 is rotatably supported by each of the forks 38. Each of the rear wheel means 34 includes a fork element 44 which is secured with the rear end 36 of the rod element 28 and rotatably supports a wheel 46.

Within the tubular members 14 and 16 at a location proximate to the attachment by the fixture 19 of the rear cross member 24 (FIG. 2), each of the rod elements 28 receives thereabout a gear 46 secured by bolt means 48 with its rod element 28 for rotation therewith within its member 14, 16. The gear 46 is provided with teeth 50 for engaging the teeth 52 of a second gear 54. The second gear 54 is received within a cylindrical housing 56 which is provided by the fixture 19 extending from the side of its member 14, 16 opposite to and in alignment with the rear cross member 24. The drive gear 54 is rotatable about an axis perpendicular to the axis of the rod element 28 and its gear 46. The rotation of gear 54 about its axis causes rotary movement of the gear 46 and its rod element 28 about the longitudinal axis of the rod element 28.

A handle means 58 is provided for the carriage device 10, and comprises a pair of parallel tubular members 60 each having at their top end a securing means 62 shown in greater detail in FIG. 10 for respectively receiving the legs 68 of an extendable portion 64 of the handle means 58. When the nuts 66 of the securing means 62 are loosened on the threaded top ends of the tubular members 60, the legs 68 may be slideably received into each of the members 60 to assume the fully collapsed position shown by the dashed lines 70 of FIG. 1, or may be extended out of the member 60 to be adjusted to any desired height and then secured in this position by tightening the nuts 66. The bottom ends of the members 60 are each provided with an extending portion 72 which is reduced in size and each received through an arcuate slot 74 in the housings 56 shown in FIG. 1, and secured in an opening 75 (FIG. 8) of one of the drive gears 54 by a set screw 77 (FIG. 2). The top ends and bottom ends of each of the tubular members 60 are braced by respective upper and lower flat horizontal cross bars 76 and 78 secured to top block units 82 and bottom block units 83.

FIG. 8 illustrates the position of the gear 54 and handle means 58 when the handle means 58 is in its extended position as shown in FIG. 1, while FIG. 9 shows the gear means rotated, in a clockwise direction with the movement of the handle means 58 in the same direction, into its folded condition illustrated in FIG. 11. Thus, with the movement of the handle means 58 from its extended to folded position, each of the drive gears 54 is rotated correspondingly, causing their associated gears 46 to rotate their rod elements 28. The rotation of the rod elements 28 causes the wheel means 30 and 34 to move towards each other as illustrated by the arrows 80 in FIG. 14 to assume their folded position shown in FIGS. 11 and 12. In their folded positions, the wheel means 30, 34 and the handle means 58 are in the plane of the frame 26 and between the tubular members 14 and 16. In this folded position, the members 60 of the handle means lie along and outside the tubular members 14 and 16 with the top of the extendable portion 64 of the handle means 58 along one end of the carriage device 10 over the wheel means 30. The wheels 42 of the wheel means 30 contact and lie flat against the top cross bar 76 which maintains them in alignment and prevents them from swivelling. For additional retention of the handle means 58, the top block units 82 at the top ends of each of the members 60 to which the top cross bar 76 is secured, has a concave or indented region 84 (FIG. 13) for receiving and holding within it the front ends 18 of the members 14 and 16 and retaining them proximate to the top cross bar 76 when the carriage device 10 is in its folded position.

The carriage device 10 is provided with a locking means 90 for automatically securing the wheel means 30, 34 and the handle means 58 in their extended positions when they are placed in their extended positions, and securing the wheel means 30 and 34 and handle means 58 in their folded positions after they are placed in their folded positions. Although a locking means 90 is preferably provided for each side of the carriage device 10 at its tubular members 14 and 16, the following detailed description is provided with respect to the locking means 90 associated with the tubular member 14 and is likewise applicable to the locking means 90 associated with the tubular member 16.

Figure 5:
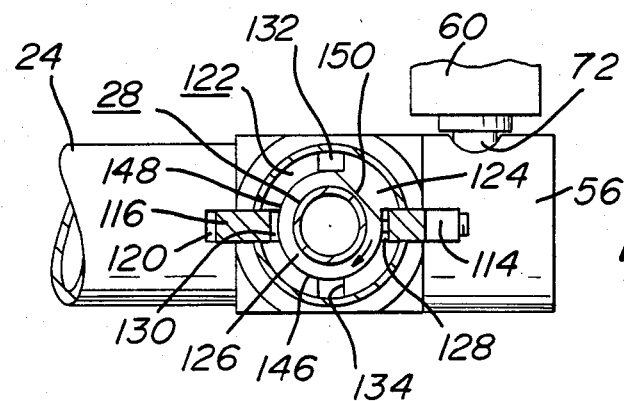
FIG. 5 is a sectional view taken on the line 5—5 of FIG. 2.

Consider initially the FIGS. 2, 5 and 8 which illustrate the locking means 90 when the carriage device 10 is in its extended position as shown in FIG. 1. The locking means 90 is shown in its locked condition and comprises a latch portion 92 having a hub 94 with an opening for being slidably received about the rod element 28. A coiled spring 102 is received about the rod element 28 between the spacer 33 and the hub 94 of the locking means 90 urging the hub 94 to the right in the direction toward the gear 46. The annular spacer 33 is secured by pin 98 for rotation with the rod element 28 within the member 14, and the extending end 36 of the rod element 28 is secured to the fork element 44 of the wheel means 34 by bolt 100 for rotation with the rod element 28. The latch means 92 is provided with a pair of opposite latch elements 104, 106 which extend radially from the hub 94 out of the tubular member 14 through a pair of opposite slots 108, 110 allowing limited motion of the hub 94 in the axial directions along the rod element 28, as illustrated by the arrows 112. Extending ends 114, 116 of the latch elements 104, 106, are respectively received through slot 118, in the housing 56 and slot 120 in the fixture 19 and the cross member 24, when in the locked condition shown.

The rod element 28 has secured thereabout at a location between the hub 94 of the latch portion 92 and the gear 54, an annular unit 122 having an upstanding portion 124 and a collar 126. The upstanding portion 124 has a pair of oppositely positioned slots or openings 128, 130, (FIG. 5) for respectively receiving therein the extending ends 114 and 116 of the latch elements 104 and 106 of the locking means 90. Since the annular unit 122 is secured by screw means 132 with the rod element 28, the engagement of its openings 128, 130 by the ends 114, 116 of the locking means 90 prevents the rotary movement of the rod element 28 and locks the wheel means 30 and 34 in their extended positions. The extending end 114 also engages the slot 129 of gear 54 (FIGS. 2 and 8), also preventing it from rotating, and thereby locking the handle means 58 in its extended position.

The upstanding portion 124 of the annular unit 122 is also provided with a second pair of oppositely positioned slots or openings 132, 134 (FIG. 5) intermediate to and angularly displaced by 90° from the slots or openings 128, 130. The extending ends 114 and 116 of the latch elements 104 and 106 of locking means 90 are respectively received within the openings 132 and 134 when the annular unit 122 rotates in the clockwise direction with the movement of the handle means towards its folded position in the direction of the arrow 136 of FIG. 1. The end 114 is also received into slot 131 of gear 54 firmly securing it against rotation.

A detent means 136 is supported within a transversely extending opening 138 in latch element 104 of the locking means 90. The detent means 136 comprises a pin 140 which has an end extending from the opening 138 and is movable toward and away from the rod element 28. An enlarged portion of the opening 138 is enclosed at one end by a screw 142 and receives therein a coiled spring 144 which engages the rear end of pin 140 and urges it out of the opening 138 in the direction toward the rod element 28. As seen in FIGS. 2 and 5, the extending end of the pin 140 contacts the collar 126 of the annular unit 122 along its outer cylindrical surface 146. The outer cylindrical surface 146 has a substantially circular cross section portion 148 (see FIG. 5) and a flattened region 150 located intermediate the opening 128 and 132 of the upstanding portion 124. The outer cylindrical surface 146 is of smaller radial extention than that of the upstanding portion 124 of the annular unit 122, so that the portion 124 extends beyond the surface 146.

Figure 3:
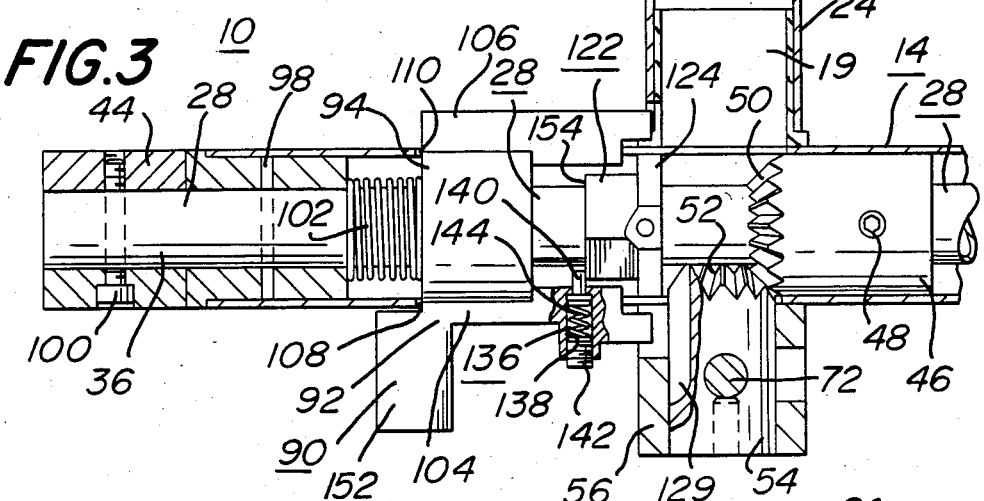
FIG. 3 is a sectional view similar to that of FIG. 2 showing the locking means in its unlocked or released condition.

In order to disengage the locking means 90 from its locked position shown in FIGS. 2 and 5, the latch portion 92, is moved against the force of the spring 102 along the rod element 28 in the direction away from the annular unit 122. This is accomplished by exertion of force on the extending handle portion 152 of the latch element 104. When the latch portion 92 is moved to the left, the ends 114 and 116 of the elements 104, 106 are retracted and removed from their respective openings 128 and 130 of the annular unit 122 and the end 114 is retracted from slot 129 of gear 54. Upon being retracted, the latch portion 92 is maintained in its disengaged condition by the detent means 136. This is accomplished by the extending end of the pin 140, which disengages the cylindrical surface 146 of the collar 126, and extends toward the rod element 28 as shown in FIG. 3. When force is removed from the handle portion 152, the extended end of pin 140 engages the vertical side wall 154 of the collar 126. This prevents the latch portion 92 from moving to the right back into the openings 128, 130 of the upstanding portion 124 and slot 129 of gear 54, and frees the handle means 58 and rod element 28 for movement. With the release of the rod element 28 and handle means 58, the handle means 58 which is in its extended position shown in FIG. 2, may be moved as shown by the arrow 136 (FIG. 1) toward its folded condition. This results in the rotation of each of the gears 54 which are connected with the handle means 58, causing rotation of the gears 46 and the rod elements 28 for placing the wheel means 30, 34 in their folded positions.

Figure 4:
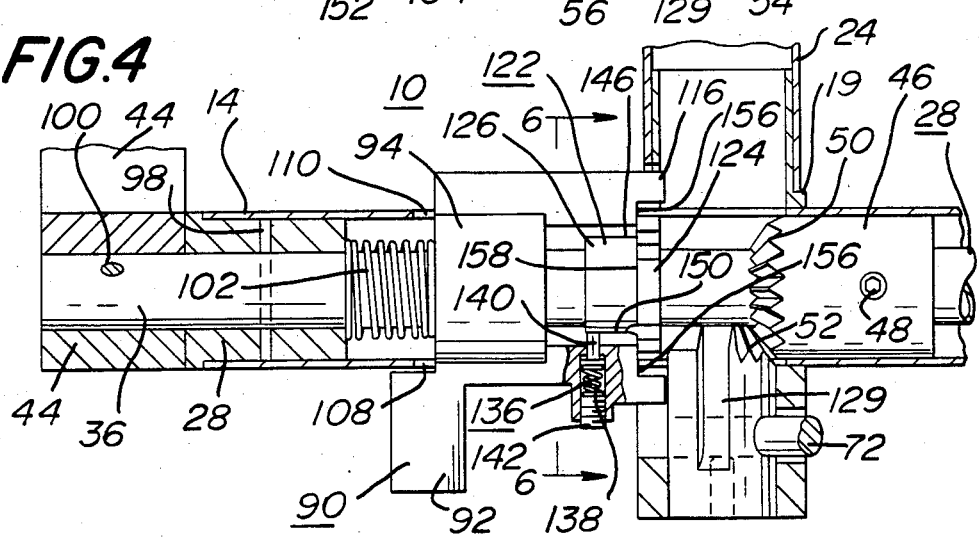
FIG. 4 is a sectional view similar to that of FIG. 3 showing the condition of the locking means as the handle means is being moved toward its folded position.
Figure 6:
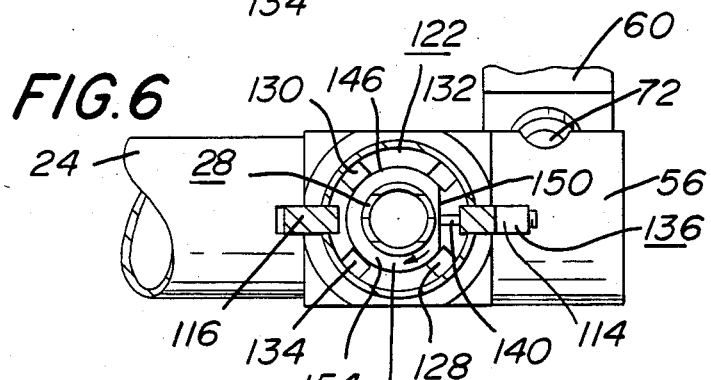
FIG. 6 is a sectional view taken on line 6—6 of FIG. 4.
Figures 7, 15:
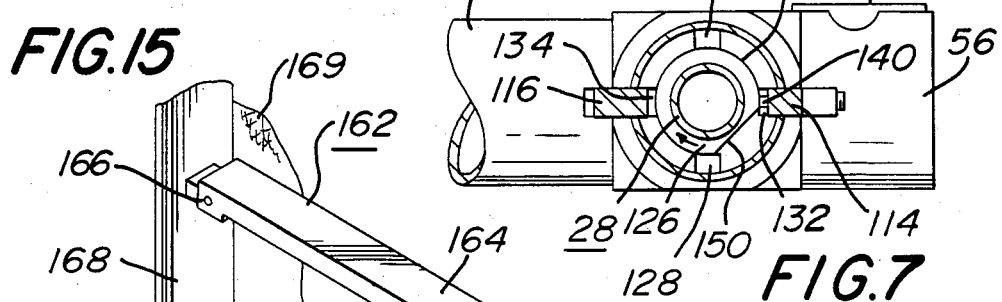
FIG. 7 is a sectional view similar to that of FIG. 5 with the carriage device locked in its folded position.
FIG. 15 is an enlarged fragmentary view of the infant seat portion of FIG. 14.
Figure 13:
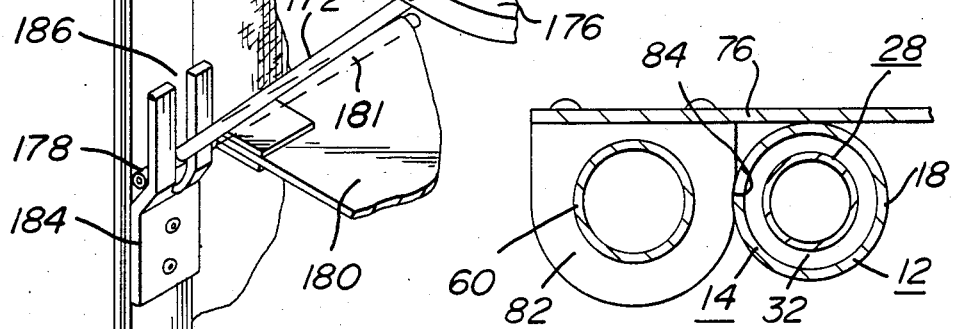
FIG. 13 is an enlarged sectional view taken on line 13—13 of FIG. 11.

As the rod element 28 rotates in the clockwise direction from its position shown in FIG. 5 to its position shown in FIG. 6, the flattened region 150 of the cylindrical surface 146 of the collar 126 moves proximate to the pin 140 of the detent means 136. The reduced height of the side wall 154 at the location of the flattened region 150 results in the pin 140 losing contact with the side wall 154, and allows the spring 102 of the locking means 90 to move the latch portion 92 toward the annular unit 122 as shown in FIG. 4. This movement causes the vertical portions 156 of the ends 114, 116 of the latch elements 104, 106 to contact the vertical surface 158 of the upstanding portion 124 of the annular unit 122. At this time, the extending end of the pin 140 overlies the flat region 150 of the cylindrical surface 146 and contacts the circular cylindrical portion 148, and is moved against the force of its spring 144 into its opening 138, as shown in FIG. 7 as the annular unit continues to move in the clockwise direction. When the handle means 58 reaches its folded position, the openings 132 and 134 are in alignment with the ends 114 and 116 of the latch elements 104, 106 and the slot 131 of the gear 54 is aligned with the end 114. The ends 114 and 116 are received into the openings 132 and 134 and slot 131, moved by the force exerted by the coil spring 102. This automatic engagement shown in FIGS. 7 and 9 locks the rod element 28 and handle means 58 against further movement. At this time, the carriage device 10 is in its folded position as shown in FIGS. 11 and 12 with its wheel means 30 and 34 and handle means 58 within the same plane of the frame structure 26.

In order to release and place the carriage device 10 in its extended position, force is exerted on the handle 152 of the locking means 90 for retracting the ends 114, 116 from the openings 132, 134 and slot 131. This results in the retention of the latch portion 92 in its retracted position by action of the detent means 136. The handle means 58 can then be moved to its extended position as shown in FIG. 1. This results in the movement of the rod element 28 in the counter-clockwise direction or direction opposed to the clockwise direction shown by the arrows in FIGS. 5 and 6, until the ends 114, 116 of the latch portion 92 are in alignment with the openings 128 and 130 and slot 129. At this time, the ends 114 and 116 are received into the openings 128 and 130, and the end 114 enters the slot 129, thereby automatically securing the carriage device 10 in its extended position. The locking means 90 is preferably utilized for securing against rotation each of the rod elements 28 received within each of the tubular members 14 and 16. In this case, the latch portion 92 of each locking means 90 must be released prior to moving the handle means 58 from one of its folded and extended positions to the other. Upon reaching its other position, the locking means 90 again automatically engage and secure their respective rod elements 28 against rotation until both locking means 90 are once more released in the manner described.

The base structure 12 of the carriage device 10, as shown in FIGS. 1 and 14, has a substantially flat bottom surface provided by a light flexible web 160 secured about and between the tubular members 14 and 16 and the front and rear cross members 22 and 24. The carriage device 10 may also provide an infant seat 162 which is shown in its folded condition in FIG. 1 and is shown in its extended operative condition in FIG. 14. The infant seat 162 comprises a U shaped retaining bar 164 which has the ends 166 of its legs 167 pivotally secured to a pair of vertical flat metal straps 168 and 170 which extend between and are secured at their tops and bottoms to the horizontal top and bottom cross bars 76, 78. The straps 168, 170 are each positioned proximate to a respective tubular member 60 of the handle means 58. A light flexible web 169 is secured to and between the straps 168, 170 and bars 76, 78 to provide the back of the infant seat 162. A pair of side rods 172, 174 (FIGS. 14 and 15), each have a top end pivotally secured to respective opposite sides 167 of the retaining bar 164 close to its front portion 176, and a bottom end joined to a horizontal cross rod 178 as shown in FIG. 15. A substantially rectangular bottom plate 180 has its back edge 181 pivotally secured with the cross rod 178, and its front edge joined at its center to the center of the front portion 176 of the retaining bar 164 by a flexible strap 182. Each one of a pair of brackets 184 is secured to a respective one of the vertical straps 168, 170 below a hinged end 166 of the retaining bar 164.

When not in use, the bottom plate 180 which forms the seat support for an infant, is folded upwardly against the web 169 of the back of the infant seat, while the retaining bar 164 is folded downwardly thereover as shown in FIG. 1. This provides a compact structure with the foldable components positioned within the plane of the tubular members 60 of the handle means 58. The foldable components are also positioned proximate to the web 160 of the frame 26 and between the tubular members 14 and 16 of the frame 26 when the carriage device 10 is folded as shown in FIGS. 11 and 12. This arrangement also maintains the infant seat 162 in its folded condition between the surfaces of the webs 160 and 169. When the carriage device 10 is placed in its extended position as shown in FIG. 1, the infant seat 162 may be extended to its operative condition as shown in FIGS. 14 and 15. This is accomplished by raising the retaining bar 164 so that it pivots about its ends 166. At this time, the ends of the cross rod 178 can be positioned above the brackets 184 and against the straps 168, 170. The front portion 176 of the retaining bar 164 is then moved in a downward direction until the ends of the side rods 174, 176, and the cross rod 178 are positioned and seated in the brackets 184 as shown in FIGS. 14 and 15. In this condition, each end of the cross bar 178 is received between one of the straps 168, 170 and a bracket 184, and each of the side rods 172, 174 extends from between the upwardly directed slot 186 at the top of its bracket 184. By its weight, an infant placed on the bottom plate 180 of the infant's seat 162, insures the retention of rods 174, 176 and 178 by the brackets 184, and prevents the infant seat from assuming its folded condition. When the infant seat 162 is to be placed in its folded condition, the front portion 176 of the retaining bar 162 is raised allowing the side rods 174, 176 and cross rod 178 to be removed from the brackets 184 and lowered to the position shown in FIG. 1. The plate 180 then can be pivoted upwardly to be positioned under the retaining bar 164 which is pivoted downwardly thereover.

The carriage device 10' shown in FIG. 16 includes means for providing a shopping cart. The carriage device 10' which is substantially similar to the device 10 of FIG. 1 has a tubular section 190 which is received about and rotatable around the front tubular cross member 22. The tubular section 190 has secured therewith the ends of a U shaped front frame element 192 which can be pivoted to an upstanding position shown is FIG. 16 or folded to lie proximate to and between the tubular members 14 and 16 and against the web 160 of the frame 26. A web 194 of flexible material is positioned over and retained by the front frame unit 192 to provide the front wall 195 of a container 196. Side walls 198, 200 are also provided by flexible webs which are secured to extend between respective vertical sides 202, 204 of the frame element 192 and the tubular members 14 and 16 respectively of the frame 26. The back vertical edges 206 of the side walls 198, 200 are preferably secured by detachable fasteners 208 with a web portion 209 about the tubular members 60 of the handle means 58. Thus, with the front frame unit 192 in its upstanding position as shown in FIG. 16, the carriage device 10' provides a container 196 formed by the front wall 195, the back wall 169 and the side walls 198 and 200. The container 196 may easily be collapsed by detaching the edges 206 and folding the webs of the side walls 198, 200 inwardly towards the bottom web 160 of the frame 26, after which the front frame unit 192 is pivoted downwardly thereover to a folded position proximate to frame 26 of the base structure 12. At this time, the carriage device 10' may be placed in its folded position as shown in FIG. 11 by releasing the locking means 90 at each of the tubular members 14 and 16, and moving the handle means 58 towards its folded position. This results in the wheels moving to their folded positions within the plane of the frame 26 as the handle means 58 reaches and is automatically locked in its position proximate to the frame structure 12.

The carriage devices 10 and 10' described herein each provide structures which are strong and can carry heavy loads on its base structure, may readily be extended to its opened position and automatically locked, and easily folded into a compact form and locked for transporting or storaging. The structure of the carriage devices enclose their rotary elements such as the rod elements 28 with their gears associated within the tubular members 14 and 16. This protects the rotating elements and also operating safety by preventing exposure to such rotating components. The carriage devices 10 and 10' are also highly versatile and in addition to a luggage carrier and shopping cart provide a baby seat which can be extended for use should such additional feature be desired by the user. This structure is also rugged and durable and requires a minimum of maintenance.

While the invention has been described and illustrated with reference to only a few representative embodiments, there will be obvious to those skilled in the art, many modifications and variations accomplishing the foregoing objects and realizing many of the advantages, which do not depart essentially from the spirit of the invention.

What is claimed is:

1. A carriage device comprising a base structure, wheel means for movably supporting the base structure having a folded position proximate the base structure and an extended position, handle means for the base structure movable between a folded position proximate to the base structure and an extended position away from the base structure, and wheel positioning means received within and substantially entirely enclosed by the base structure and actuated by the handle means, the wheel positioning means being secured with the wheel means for moving the wheel means between the extended and folded positions as the handle means is moved correspondingly between its extended and folded positions, the base structure comprising a frame having a pair of parallel elongated tubular members with front and rear ends and a plurality of fixtures secured therewith, and the wheel positioning means including a pair of elongated rod elements each having front and rear ends and each being received and substantially enclosed within a respective one of the members and rotatable with the movement of the handle means for moving the wheel means between the extended and folded positions, the rod elements of the wheel positioning means each having gear means which are substantially entirely enclosed by the tubular members and fixtures and are engaged by the handle means for rotating the rod elements wth the movement of the handle means.

2. The carriage device of claim 1 in which the frame of the base structure includes a front cross member and a rear cross member each extending between and secured respectively by the fixtures at locations proximate to the front ends and rear ends of the tubular members to provide a rectangular configuration, and the wheel means includes a plurality of wheels one of which is secured at each of the front ends and rear ends of the rod elements and proximate to the front and rear ends of the corresponding tubular members.

3. The carriage device of claim 2 in which each of the gear means of the wheel positioning means has first and second interengaged gears each rotatable about a respective axis which is perpendicular to the other axis, each of the first gears is received and enclosed within a respective tubular member of the frame and secured with a respective one of the rod elements intermediate its front and rear ends and closer to its rear end while its second gear is enclosed within a respective one of the fixtures and secured with the handle means for being rotated with the movement of the handle means.

4. The carriage device of claim 3 in which the handle means comprises a pair of spaced parallel tubular bottom portions having ends engaging a respective one of the second portions of the gear means, and an upper portion extendable from and receivable within the bottom portions for adjusting the size of the handle means, and the base structure includes web means secured with members of the frame to provide a bottom carriage support surface.

5. The carriage device of claim 4 in which the wheels which are positioned proximate to the front ends of the members each swivel about a axis perpendicular to the plane of the frame when the wheel means are in the extended position, and each of the wheels are positioned between the members and within the plane of the frame of the base structure when the wheel means are in the folded position.

6. The carriage device of claim 5 which includes an infant seat secured between and with the bottom portions of the handle means and extend over the frame structure when in use and which is foldable into the plane of the bottom portions of the handle means when not in use.

7. The carriage device of claim 4 which includes a front frame unit which is pivotally secured with the front cross member of the base structure and is movable between a folded position between and in the plane of the tubular members of the frame and an extended position in which it is upstanding at the front end of the frame structure, and flexible web means which is supported by the front frame unit to provide a front wall, and extends between the frame unit, the bottom portions of the handle means and the tubular members of the frame to provide a pair of side walls of a container formed when the handle means and frame unit are in their extending positions, and the front and side walls are positioned proximate to the plane of the frame when the frame unit and handle means are in their folded positions.

8. The carriage device of claim 1 which includes locking means which engages the wheel positioning means for releasably locking the wheel positioning means against movement when the wheel means is in its extended position and engages the wheel positioning means for releasably locking the wheel positioning means against movement when the wheel means is in its folded position, and detent means selectively operative for maintaining the locking means in its disengaged condition without requiring the displacement of the wheel means from either of its extended and folded positions.

9. The carriage means of claim 8 in which the frame of the base structure includes a front cross member and a rear cross member each extending between and each secured by the fixtures at locations proximate to respective front ends and rear ends of the tubular members to provide a rectangular configuration, and the wheel means includes a plurality of wheels one of which is secured at each of the front ends and rear ends of the rod elements and proximate to the front and rear ends of corresponding tubular members.

10. The carriage device of claim 1 which includes locking means automatically engaging the wheel positioning means for releasably securing the wheel means and handle means against movement from their folded positions when the handle means is placed in its folded position and which automatically engages the wheel positioning means for releasably securing the wheel means and handle means against movement from their extended positions when the handle means is placed in its extended position, and detent means selectively operative for maintaining the locking means in its disengaged condition without requiring the displacement of the wheel means from either of its extended and folded positions.

11. The carriage device of claim 10 in which the locking means includes at least one latch portion which releasably engages and locks a respective one of the rod elements against rotation when the handle means is moved to either one of its folded and extended positions, the rod element upon being disengaged by the latch portion of the locking means is rotatable with the movement of the handle means from one of its folded and extended positions to the other for being locked therein.

12. A carriage device comprising a base structure, wheel means for movably supporting the base structure having a folded position proximate the base structure and an extended position, handle means for the base structure movable between a folded position proximate to the base structure and an extended position away from the base structure, wheel positioning means received within and substantially enclosed by the base structure actuated by the handle means for moving the wheel means between the extended and folded positions as the handle means is moved correspondingly between its extended and folded positions, and locking means which engages the wheel positioning means for releasably locking the wheel positioning means against movement when the wheel means is in its extended position and engages the wheel positioning means for releasably locking the wheel positioning means against movement when the wheel means is in its folded position, the base structure comprises a frame having a pair of parallel tubular members with front and rear ends, a front cross member and a rear cross member each extending between and each secured proximate to respective front ends and rear ends of the tubular members to provide a rectangular configuration, the wheel positioning means includes a pair of elongated rod elements each having front and rear ends and each being received within a respective one of the members and rotatable with the movement of the handle means for moving the wheel means between the extended and folded positions, and the rod elements of the wheel positioning means each have gear means which are engaged by the handle means for rotating the rod elements with the movement of the handle means, each of the gear means of the wheel positioning means has first and second interengaged portions, each first portion is rotatable about a first axis and each second portion is rotatable about a second axis perpendicular to the first axis, the first portions of each gear means is secured with a respective one of the rod elements at a location intermediate its front and rear ends and closer to its rear end while its associated second portion is movably received within an extension of the rear cross member and secured with the handle means for being rotated with the movement of the handle means, and the wheel means includes a plurality of wheels one of which is secured at each of the front ends and rear ends of the rod elements and proximate to the front and rear ends of corresponding tubular members.

13. The carriage means of claim 12 in which the handle means comprises a pair of spaced parallel tubular bottom portions each having a first end engaging a respective one of the second portions of the gear means and a second end, and an upper portion extendable and contractable from the second ends of the bottom portion for adjusting the size of and collapsing the handle means, and the base structure includes web means secured with the members of the frame to provide a bottom carriage support surface.

14. The carriage means of claim 13 in which the wheels which are positioned proximate to the front ends of the members each swivel about a axis perpendicular to the plane of the frame when the wheel means are in the extended position, and each of the wheels are positioned between the members and within the plane of the frame of the base structure when the wheel means are in the folded position.

15. A carriage device comprising a base structure, wheel means for movably supporting the base structure having a folded position proximate the base structure and an extended position, handle means for the base structure movable between a folded position proximate to the base structure and an extended position away from the base structure, wheel positioning means received within and substantially enclosed by the base structure actuated by the handle means for moving the wheel means between the extended and folded positions as the handle means is moved correspondingly between its extended and folded positions, and locking means for releasably securing the wheel positioning means against movement, the base structure comprises a frame having a pair of parallel tubular members with front and rear ends, and the wheel positioning means includes a pair of elongated rod elements each having front and rear ends and each being received within a respective one of the members and rotatable with the movement of the handle means for moving the wheel means between the extended and folded positions, the rod elements of the wheel positioning means each have gear means which are engaged by the handle means for rotating the rod elements with the movement of the handle means, the frame of the base structure includes a front cross member and a rear cross member each extending between and secured respectively proximate to the front ends and rear ends of the tubular members to provide a rectangular configuration, and the wheel means includes a plurality of wheels one of which is secured at each of the front ends and rear ends of the rod elements and proximate to the front and rear ends of the corresponding tubular members, each of the gear means of the wheel positioning means has first and second interengaged gears each rotatable about a respective axis which is perpendicular to the other axis, each of the first gears is secured with a respective one of the rod elements intermediate its front and rear ends and closer to its rear end while its second gear is secured with the handle means for being rotated with the movement of the handle means, and the locking means engages the wheel positioning means and the second gear of the gear means for releasably securing the wheel means and handle means against movement from their folded positions when placed in their folded positions and against movement from their extended positions when placed in their extended positions, the locking means has at least one latch portion which releasably engages and locks a respective one of the rod elements and its associated second gear against rotation when the handle means is moved to either one of its folded and extended positions, the rod element and second gear upon being disengaged by the latch portion of the locking means are rotatable with the movement of the handle means from one of its folded and extended positions to the other for being locked therein, the rod element has secured therewith an annular unit with an upstanding portion having a side wall with angularly spaced first and second openings for being respectively engaged by the latch portion of the locking means and the second gear has angularly spaced first and second openings for being respectively engaged by the latch portion of the locking means when the handle means is in either of its folded and extended positions.

16. The carriage device of claim 15 in which the locking means includes spring means for urging the latch portion toward and into contact with the side wall of the upstanding portion of the annular unit for moving the latch portion into one of its openings upon its alignment therewith and into a corresponding opening of the second gear, and detent means for maintaining the latch means out of contact with the side wall of the upstanding portion upon disengagement of the latch portion with its movement out of one of the openings of the upstanding portion and allowing the latch portion to contact the side wall of the upstanding portion when the rod element upon rotation moves the opening out of alignment with the latch portion.

17. The carriage device of claim 16 in which the annular unit is positioned proximate to the gear means and has a collar with an outer cylindrical surface of substantially circular cross-section and a vertical end surface, the cylindrical surface of the collar has a flattened region angularly positioned intermediate the first and second openings of the upstanding portion, and the locking means includes detent means having a vertically movable pin extending from the latch portion and spring means urging the pin towards the collar of the annular unit, the pin engages the vertical end surface of the collar when the latch portion is moved out of one of the openings of the upstanding portion and retains the latch portion out of contact with the side wall of the upstanding portion, the pin disengages the end surface of the collar when the rod element rotates to bring the flattened surface of the collar proximate to the pin allowing the pin to engage the cylindrical surface of the collar and the latch portion to contact the side wall of the upstanding portion so that the latch portion moves into one of the openings of the upstanding portion upon being aligned therewith and also extends into a corresponding opening of the second gear.

* * * * *